(12) United States Patent
Ikarashi (10) Patent No.: US 12,353,554 B2
(45) Date of Patent: Jul. 8, 2025

(54) SECURE COMPUTATION SYSTEM, SECURE COMPUTATION APPARATUS, SECURE COMPUTATION METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 196 days.

(21) Appl. No.: 18/031,884

(22) PCT Filed: Oct. 16, 2020

(86) PCT No.: PCT/JP2020/039080
§ 371 (c)(1),
(2) Date: Apr. 14, 2023

(87) PCT Pub. No.: WO2022/079893
PCT Pub. Date: Apr. 21, 2022

(65) Prior Publication Data
US 2023/0367879 A1    Nov. 16, 2023

(51) Int. Cl.
*H04L 9/08*     (2006.01)
*G06F 21/57*   (2013.01)

(52) U.S. Cl.
CPC .................. *G06F 21/57* (2013.01)

(58) Field of Classification Search
CPC .................. G06F 21/57; H04L 9/085
See application file for complete search history.

(56) References Cited

U.S. PATENT DOCUMENTS

2021/0167946 A1* 6/2021 Bitan .................. H04L 9/085
2021/0334100 A1* 10/2021 Ishizaka ................ G09C 1/00

OTHER PUBLICATIONS

Anders Dalskov, Daniel Escudero and Marcel Keller, "Secure Evaluation of Quantized Neural Networks", 2021, Sciendo (Year: 2021).*

(Continued)

*Primary Examiner* — Joseph P Hirl
*Assistant Examiner* — Aayush Aryal
(74) *Attorney, Agent, or Firm* — XSENSUS LLP (57) ABSTRACT

A set SP(i) of k secure computation apparatuses selected from a set PA of n secure computation apparatuses repeats processing of multiplying a share according to a secret sharing scheme, by power-of-2 number $2\rho(SP(i))$ with the share $\rho(SP(i))$ as an exponent, the share $\rho(SP(i))$ being obtained by secret sharing of $\rho$ according to a replicative secret sharing scheme, and redistribution the value obtained in the processing is redistributed into the set SP(i+1) of k secure computation apparatuses selected from the set PA of n secure computation apparatuses. However, the final time is not re-dispersed. Thus, a share of a multiplicative rotation result is obtained. However, the final time is not re-dispersed. Thus, a share of a multiplicative rotation result is obtained.

12 Claims, 4 Drawing Sheets

(56) References Cited

OTHER PUBLICATIONS

Amada et al., "Multiparty Computation for Floating Point Arithmetic with Less Communication over Small Fields", Information Processing Society of Japan, Journal of Information Processing, vol. 60, No. 9, Sep. 2019, pp. 1433-1447 (30 pages including English Translation).

Jaak Randmets, "Programming Languages for Secure Multi-party Computation Application Development", PhD thesis. Dissertationes Mathematicae Universitatis Tartuensis, University of Tartu, vol. 113, 2017, pp. 1-172.

Anders Dalskov, et al., "Secure Evaluation of Quantized Neural Networks", Proceedings on Privacy Enhancing Technologies, [Online] vol. 2020, No. 4, Oct. 1, 2020, 22 pages, XP055932904.

* cited by examiner

SECURE COMPUTATION SYSTEM, SECURE COMPUTATION APPARATUS, SECURE COMPUTATION METHOD, AND PROGRAM

CROSS-REFERENCE TO RELATED APPLICATION

The present application is based on PCT filing PCT/JP2020/039080, filed Oct. 16, 2020, the entire contents of which are incorporated herein by reference.

TECHNICAL FIELD

The present invention relates to a secure computation technique, and particularly to a rotation technique.

BACKGROUND ART

The rotation (cyclic shift) is one of the very basic processes in the computer. In a secure computation (see, for example, NPL 1, NPL 2, and the like) the rotation can be performed while the value is still concealed.

CITATION LIST

Non Patent Literature

[NPL 1] Takashi Nishide, Takuma Amada, "Multiparty Computation for Floating Point Arithmetic with Less Communication over Small Fields", IPSJ Journal, Vol. Vol. 60 No. 9, pp. 1433-1447 (2019).

[NPL 2] Randmets, J., "Programming Languages for Secure Multiparty Computation Application Development," PhD thesis. University of Tartu (2017).

SUMMARY OF INVENTION

Problems to be Solved by the Invention

However, the conventional rotation on secure computation has a problem of poor efficiency.

The present invention has been made in consideration of such points, and an object of the present invention is to provide a technique for efficiently rotating by secure computation.

Means to Solve the Problems

A secure computation apparatus $PA(\varphi(i, 0))$ obtains a share $<a>_{(PA(k) \in SP(i+1))}$ using random numbers $r(i, 1), \ldots, r(i, k-1)$) that are shared by a share $<a>_{(PA(0) \in SP(i))}$, a secure computation apparatus $PA(\varphi(i, 0))$, and a secure computation apparatuses $PA(\varphi(i, 1)) \ldots, PA(\varphi(i, k-1))$, and then transmits to a secure computation apparatus $PA(\varphi(i, k))$, each of secure computation apparatuses $PA(\varphi(i, j))$ performs redistribution to obtain a share $<a>_{(PA(j) \in SP(i+1))}$ using a share $<a>_{(PA(j) \in SP(i))}$ for $j=1, \ldots, k-1$, and a random number $r(i, j)$. Here, n and k are integers of 2 or more; $n>k$; $N={}_nC_k$; PA is a set of n secure computation apparatuses $PA(0), \ldots, PA(n-1)$; $SP(i)$ is a set of k secure computation apparatuses $PA(\varphi(i, 0)), \ldots, PA(\varphi(i, k-1))$ selected from PA; $i=0, \ldots, N-1$; $i'=0, \ldots, N-2$; P is an integer of 1 or more; p is the number of bits of an integer P; a is an element of a residue class ring $Z_P$ modulo P; share $<a>_{(SP(i))}$ is k shares held by the set $SP(i)$, obtained by secret sharing of a according to secret sharing scheme; $<a>_{(PA(\theta)|SP(i))}$ is a share held by a secure computation apparatus $PA(\theta) \in SP(i)$ among the share $<a>_{(SP(i))}$; $\rho$ is an element of a residue class ring $Z_p$ modulo p; sub-shares of n shares $«\rho»_0, \ldots, «\rho»_{n-1}$ obtained by the secret sharing of $\rho$ according to a replicated secret sharing scheme are $\rho_0, \ldots, \rho_{N-1} \in Z_p$; and $\rho_{(SP(i))}$ is a sub-share corresponding to the set $SP(i)$ among the sub-shares $\rho_0, \ldots, \rho_{N-1}$.

Effects of the Invention

Thus, rotation can be efficiently performed by secure computation.

DESCRIPTION OF EMBODIMENTS

Hereinafter, embodiments of the present invention will be described with reference to the drawings.

[Principle]

First, the principle of the embodiment will be described. The multiplication of a power number of 2 corresponds to the rotation of the bit string. For example, multiplying a power of 2 by a residue class ring having a p-bit Mersenne prime as an order (number of elements) is equivalent to rotating a bit string of length p. In this embodiment, rotation is realized by multiplying a power number of 2 on the secure computation. This rotation is called a multiplicative rotation.

The point of the multiplicative rotation in this embodiment is as follows.

Step I: A set $SP(i)$ of k secure computation apparatuses selected from a set PA of n secure computation apparatuses performs a unit rotation, which multiplies a share, according to an additive secret sharing scheme, by power-of-2 number $2^{\rho(SP(i))}$ with the share $\rho(SP(i))$ as an exponent, the the share $\rho(SP(i))$ being obtained by secret sharing of $\rho$ according to a replicative secret sharing scheme.

Step II: The value obtained in step I is redistributed into the set $SP(i+1)$ of k secure computation apparatuses selected from the set PA of n secure computation apparatuses.

Step III: Repeat steps I and II for all sets. However, the redispersion will not be performed in the final round. Thus, the share of the multiplicative rotation result is obtained.

A more detailed description will be given. The secure computation system of the present embodiment has n secure computation apparatuses $PA(0), \ldots, PA(n-1)$. Here, the set of n secure computation apparatuses $PA(0), \ldots, PA(n-1)$ is represented as PA, and the set of k secure computation apparatuses $PA(\varphi(i, 0)), \ldots, PA(\varphi(i, k-1))$ selected from PA is represented as $SP(i)$. The set $SP(i)$ executes the i-th unit rotation. Here, n and k are integers of 2 or more, $n>k$, $N={}_nC_k$, and $i=0, \ldots, N-1$. ${}_nC_k$ represents the total number of combinations when selecting k different from each other from n different from each other.

Further, $^{SM}(\alpha, \beta)$ is a function value of $\alpha$ and $\beta$, and satisfies $\{\varphi(i, 0), \ldots, \varphi(i, k-1)\} \subset \{0, \ldots, n-1\}$. $SP(0), \ldots, SP(N-1)$ are different from each other, and SP(0), . . . , SP(N−1) hold $|SP(i')\cap SP(i'+1)^c|=1$ for i'=0, . . . , N−2. Here, ac represents a complement set of α, and |α| represents the number of elements of α. That is, the set SP(i'), which executes the i'-th unit rotation, is a set that differs from the set SP(i'+1) for executing the i'+1st unit rotation only by one secure computation apparatus.

A value α, which is a subject of multiplicative rotation, is an element of a residue class ring $Z_P$ modulo P. Here, P is an integer of 1 or more, and p is the number of bits of the integer P. For example, when P is the Mersenne number P, $P=2^p-1$ is established and p is the number of bits of P. An example of P is a prime number, for example P is a Mersenne prime number. k shares obtained by secret sharing of a according to the (k, k)-additive secret sharing scheme are represented as $<a>_0$, $<a>k-1$. That is, $a=<a>_0+\ldots+<a>_{k-1}$ $\in Z_P$ (that is, $a=<a>_0+\ldots+<a>_{k-1}$ mod P) is satisfied. (k, k)-additive secret sharing scheme is a (k, n)–replicative secret sharing scheme (see, for example, reference 1 and the like) in the case of n=k.

[NPL 1] Dai Igarashi, Koki Hamada, Ryo Kikuchi, Koji Chida, "Improvement of Secure Computation Radix Sort Aiming at Statistical Processing of Internet Environment Response 1 Second", SCIS2014, 2014.

The shares $<a>_{(SP(i))}$ are k shares $<a>_0, \ldots, <a>_{k-1}$, which are k shares held by a set SP(i) according to (k, k)-additive secret sharing scheme, and a share $<a>_{(SP(0))}$ is especially obtained by secret sharing of a according to the (k, k)-additive secret sharing scheme. $<a>_{(PA(\theta)\in SP(i))}$ is a share held by the secure computation apparatus PA(θ)∈ SP(i) of shares $<a>_{(SP(i))}$.

An exponent (power exponent) ρ in the multiplicative rotation is an element of the residue class ring $Z_p$ modulo p. Sub-shares of n shares $<\!\!<\rho\!\!>\!\!>_0, \ldots, <\!\!<\rho\!\!>\!\!>_{n-1}$ obtained by secret sharing ρ according to the (k, n)-replicative secret sharing scheme are represented as $\rho_0, \rho_{N-1}\in Z_p$. That is, $\rho=\rho_0+\ldots+\rho_{N-1}\in Z_p$ (that is, $\rho=\rho_0+\ldots+\rho_{N-1}$ mod p) is satisfied. For w=0, . . . , n−1, a share $<\!\!<\rho\!\!>\!\!>_w$ is a proper subset of the sub-shares $\rho_0,\ldots \rho_{N-1}$ ($<\!\!<\rho\!\!>\!\!>_w\subset\{\rho 0,\ldots,\rho N-1\}$), and arbitrary k shares selected from $<\!\!<\rho\!\!>\!\!>_0,\ldots,<\!\!<\rho\!\!>\!\!>_{N-1}$ include all sub-shares $\rho_0, \ldots, \rho_{N-1}$. Here, information of ρ cannot be obtained from shares less than k. Here, among the sub-shares $\rho_0, \ldots, \rho_{N-1}$, the sub-share corresponding to the set SP(i) is represented as $\rho_{(SP(i))}$. That is, $\rho_{(SP(i))}$ corresponds to k secure computation apparatuses PA(φ(i, 0)), . . . , PA(φ(i, k−1)) belonging to the set SP(i) are represented a sub-share included in a share $<\!\!<\rho\!\!>\!\!>_{(\varphi(i,\,0))}, \ldots, <\!\!<\rho\!\!>\!\!>_{(\varphi(i,\,k-1))}$.

The important point is that SP(0), . . . , SP(N−1) hold $|SP(i')\cap SP(i'+1)^c|=1$ for i'=0, . . . , N−2. Here, PA(φ(i', 0)) represents a secure computation apparatus included in the set SP(i') and not included in the set Sp(i'+1). Further, PA(φ(i'+1, k)) represents a secure computation apparatus not included in the set SP(i') but included in the set SP(i'+1). Further, the PA(φ(i', j)) for j=1, k−1 represents a secure computation apparatus included in both the set SP(i') and the set SP(i'+1).

<Unit Rotation>

The secure computation apparatus PA(φ(i, 0)), PA(φ(i, k−1)) performs calculation of $2^{\rho(i)}\in Z_p$ (that is, $2^{\rho(SP(i))}$ $<a>_{(SP(i))}$ mod P) at unit rotation of the i-th time (i=0, . . . , N−1) by using $2^{\rho(SP(i))}$ and $<a>_{(SP(i))}$, and then the obtained value is set as a new share $<a>_{(SP(i))}$.

<Redistribution>

Every time the unit rotation of the i'-th (i'=0, . . . , N−2) is executed, the i'-th redistribution is performed. The redistribution is not performed after the N−1-th unit rotation.

In the i'-th redistribution, first, the secure computation apparatus PA(φ(i', 0)) shares each secure computation apparatus PA(φ(i', 1)), . . . , PAφ(i', k−1)), and random numbers r(i', 1), . . . , r(i', k−1))∈$Z_p$. There is no limitation on the method of sharing the random numbers r(i', 1), R(i', k−1)). For example, the secure computation apparatus PA(φ(i', 0)) generates random numbers r(i', 1), . . . , R(i', k−1)), and these may be transmitted to the secure computation apparatus PA(φ(i', 1)), . . . , PA(φ(i', k−1)). Alternatively, each of the secure computation apparatuses PA(φ(i', 1)), . . . , PA(φ(i', k−1)) generates random numbers r(i', 1), . . . , R(i', k−1), and may transmit to a secure computation apparatus PA(φ(i', 0)). Alternatively, a seed is shared between the secure computation apparatus PA(φ(i', 0)) and the secure computation apparatus PA(φ(i', 1)), . . . , PA(φ(i', k−1)), and random numbers r(i', 1), . . . , R(i', k−1)) may be generated by a predetermined processing using the seed.

Further, at the i'-th redistribution, the secure computation apparatus PA(φ(i', 0)) obtains a share $<a>_{(PA(k)\in SP(i'+1))}$ by using a share $<a>_{(PA(0)\in SP(i'))}$ and random numbers r(i', 1), . . . , r(i', k−1)). That is, the secure computation apparatus PA(φ(i', 0)) obtains the share $<a>_{(PA(k)\in SP(i'+1))}$ by the following equation.

$$\langle a\rangle_{(PA(k)\in SP(i'+1))} = \langle a\rangle_{(PA(0)\in SP(i'))} - \sum_{1\leq j<k} r(i', j)$$

The secure computation apparatus PA(φ(i', 0)) transmits the share $<a>_{(PA(k)\in SP(i'+1))}$ obtained as described above to the secure computation apparatus PA(φ(i'+1, k)).

In the i'-th redistribution, each of the secure computation apparatuses PA(φ(i', j)) obtains the share $<a>_{(PA(j)\in SP(i'+1))}$ using shares $<a>_{(PA(j)\in SP(i'))}$ for j=1, . . . , k−1, and the random number r(i', j). That is, each of the secure computation apparatuses PA(φ(i', j)) obtains the share $<a>_{(PA(j)\in SP(i'+1))}$ by the following equation.

$$\langle a\rangle_{(PA(j)\in SP(i'+1))} = \langle a\rangle_{(PA(j)\in SP(i'))} + r(i', j)$$

<Iterative Processing>

As described above, the set SP(i) executes unit rotation followed by redistribution for each of i=0 to i=N−2, and executes unit rotation for i=N−1. That is, this iterative process is a repetition of unit rotation→redistribution→unit rotation→redistribution→ . . . →unit rotation, and unit rotation is executed N times and redistribution is executed N−1 times. If this is simply done, the number of communication stages is the number of redistributes as it is, and becomes N−1 stage.

However, unit rotation and redistribution can be parallelized with respect to communication. Because the secure computation apparatus PA(φ(i'+1, k)) waiting for the redistributed data is not included in the set SP(i') that executes the i'-th redistribution, the other secure computation apparatus of the set SP(i'+1) that executes the redistribution of the i'+1 time can execute only the offline processing and move to the next unit rotation processing without waiting for the reception of the redistributed data. Since the number of shares according to the (k, k)-additive secret sharing scheme is k, if the order of the set SP(0), . . . , SP(N−1) is set appropriately, unit rotation of the maximum k times can be performed in one stage. As a result, the number of communication stages can be reduced to (N−1)/k stages.

First Embodiment

Next, a first embodiment of the present invention will be described.

<Configuration>

Figure 1:
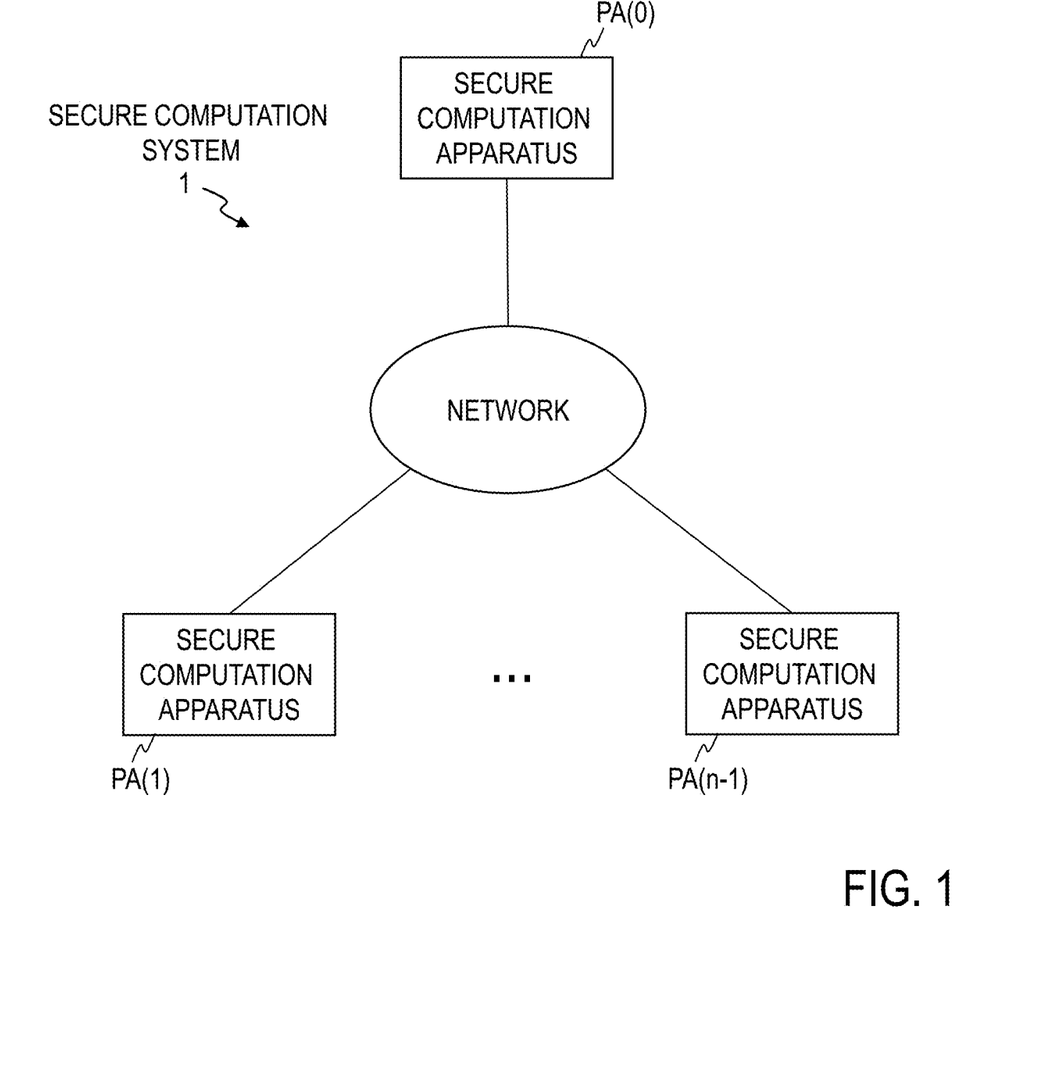
FIG. 1 is a conceptual diagram illustrating the configuration of the secure computation system of the embodiment.

As illustrated in FIG. 1, the secure computation system 1 of the present embodiment has n secure computation apparatuses PA(0), . . . , PA(n−1). Secure computation apparatus PA(0), . . . , PA(n−1) are configured so that data can be exchanged. In this embodiment, the secure computation apparatus PA(0), . . . , PA(n−1) is configured to be capable of communication via a network, and an example of exchanging data via a network will be described. However, this does not limit the present invention, and the secure computation apparatus PA(0), . . . , PA(n−1) may be configured so that data can be exchanged via a portable recording medium, and data may be exchanged via a portable recording medium.

Figure 2:
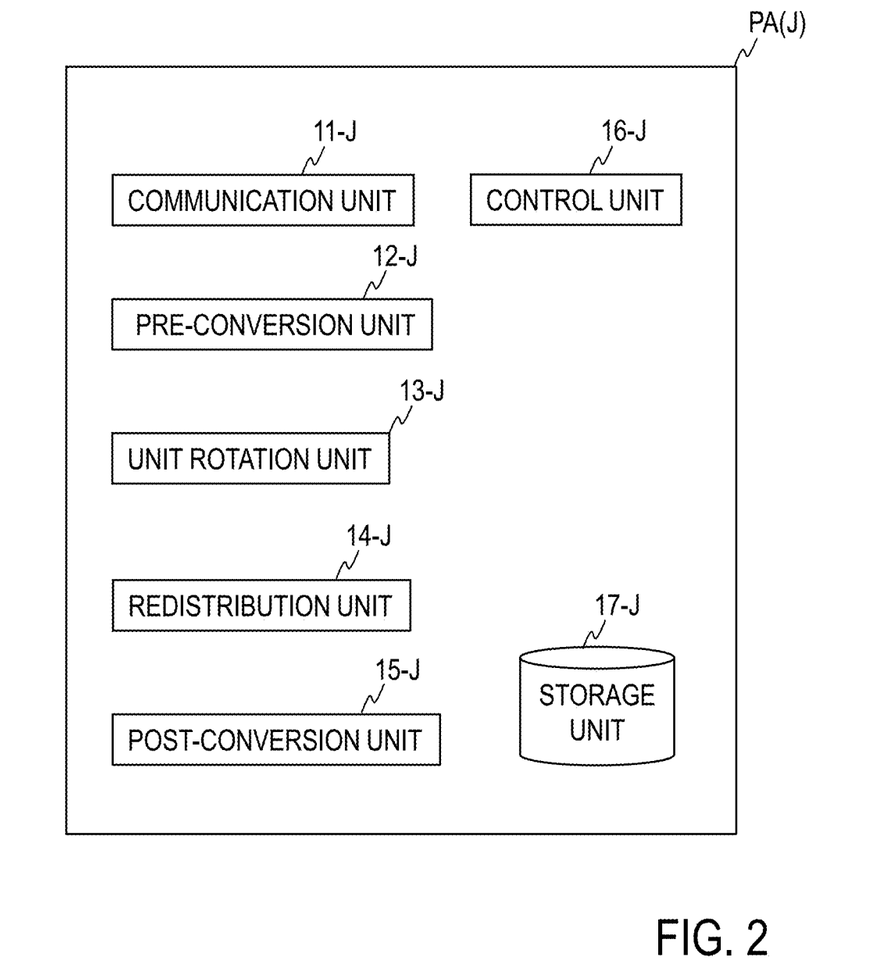
FIG. 2 is a block diagram illustrating the functional configuration of the secure computation apparatus of the embodiment.

As illustrated in FIG. 2, the secure computation apparatus PA(j) (where j=0, . . . , N−1) includes a communication unit 11-$j$, a pre-conversion unit 12-$j$, a unit rotation unit 13-$j$, a redistribution unit 14-$j$, and a post-conversion unit 15-$j$, a control unit 16-$j$, and a storage unit 17-$j$. Unless otherwise specified, the secure computation apparatus PA(j) executes each process under the control of the control unit 16-$j$, and the data obtained by each process is stored in the storage unit 17-$j$, and is read out and used according to the needs. Further, data is exchanged between the secure computation apparatuses PA(0), PA(n−1) through each communication unit 11-$j$.

<Processing>

Next, the processing of this embodiment will be described.

«Assumption»

As a premise, each share [a] of n shares $[a]_0$, $[a]_{n-1}$ obtained by secret sharing of the value a according to (k, n)-secret sharing scheme (where w∈ {0, . . . , n−1}) or public value a, and n shares obtained by secret sharing of ρ according to the (k, n)-replicative secret sharing scheme each share «ρ»$_w$ of «ρ»0, «ρ»$_{n-1}$ is stored in the storage unit 17-j of each secure computation apparatus Pa(w). The (k, n)-secret sharing scheme is not limited, and may be, for example, (k, n)-replicative secret sharing scheme, or (k, n)-Shamir secret sharing scheme (see, for example, reference 2 and the like).

[Reference Literature 2] A. Shamir, "How to share a secret," Communications of the ACM, Vol. 22, No. 11, pp. 612-613, -613.1979.

«Multiplicative Rotation Processing»

Figure 3:
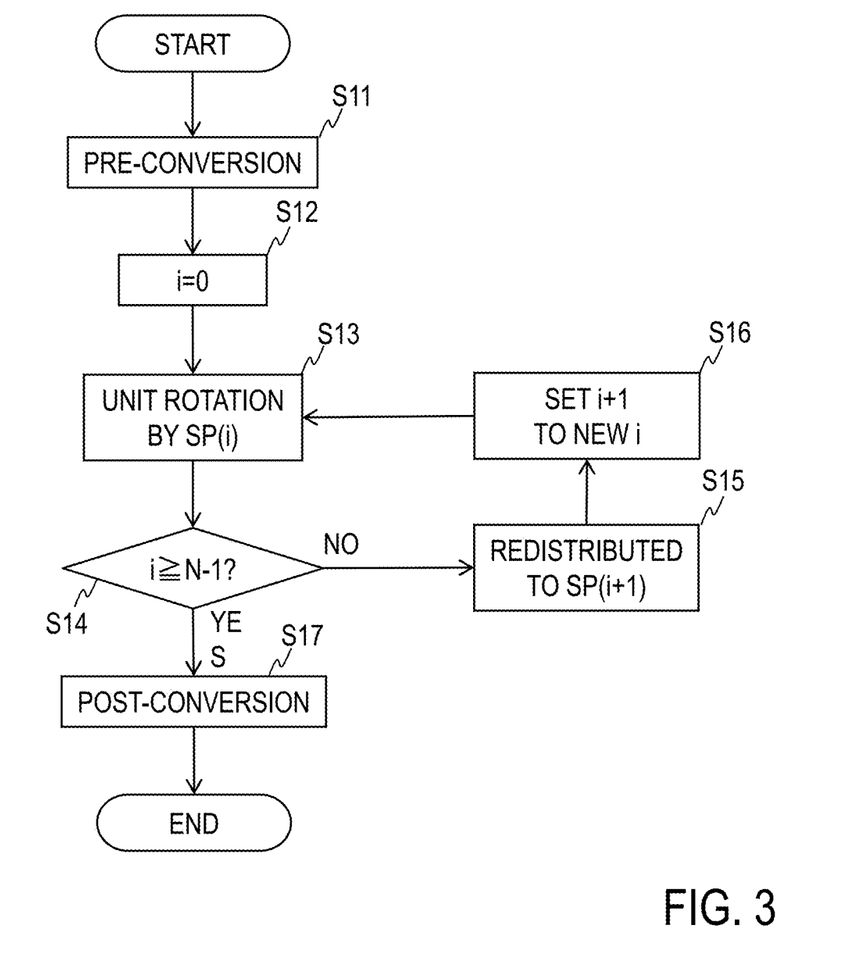
FIG. 3 is a flow chart for exemplifying the secure computation method of the embodiment.

The processing of the present embodiment will be described with reference to FIG. 3.

Pre-conversion units 12-φ(0, 0), 12-φ(0, k−1) of k secure computation apparatuses RA(φ(0, 0)), RA(φ(0, k−1)) belonging to the set SP(0) convert the share $[a]_{\phi(0, 0)}$, . . . , $[a]_{\phi(0, k-1)}$ held in the set SP(0) or the published value a to shares $\langle a \rangle_0$, . . . , $\langle a \rangle_{k-1}$ (share $\langle a \rangle_{(SP(0))}$) obtained by secret sharing of a according to (k, k)-additive secret sharing scheme. Share $\langle a \rangle_\theta$ is stored in the storage unit 17-θ of the secure computation apparatus PA(θ) (θ∈ {φ(0, 0), . . . , φ(0, k−1)}) belonging to the set SP(0) (step S11).

The control units 16-$w$ of all the secure computation apparatuses PA(w) are set to i=0 (step S12).

Unit rotation unit 13-φ(i, 0), . . . , $^{SM}$(i, k−1) of k secure computation apparatuses PA($^{SM}$(i, 0)), . . . , RA(φ(i, k−1)) belonging to the set SP(i) performs calculation of $2^{\rho(SP(i))}$ ∈$Z_p$ respectively, and stores the value obtained by this as a new share $\langle a \rangle_{(SP(i))}$ in the storage unit 17-φ(i, 0), . . . , (φ(i, k−1) (step S13).

The control unit 16-$j$ determines whether or not i≥N−1 (step S14). If i≥N−1, the process proceeds to step S17, and if not i≥N−1, the process proceeds to step S15.

In step S15, first, the redistribution unit 14-φ(i, 0) of the secure computation apparatus PA(φ(i, 0)) shares each redistribution unit 14-φ(i, 1), . . . , 14-φ(i, k−1) of the secure computation apparatus PA(φ(i, 1)), . . . , PA(φ(i, k−1)), and random numbers r(i, 1), . . . , r(i, k−1)∈$Z_p$. Further, the redistribution unit 14-φ(i, 0) of the secure computation apparatus PA(φ(i, 0)) obtains the share $\langle a \rangle_{(PA(k)\in SP(i+1))}$ using a share $\langle a \rangle_{(PA(0)\in SP(i))}$ and random numbers r(i, 1), . . . , r(i, k−1)). That is, the secure computation apparatus PA(φ(i, 0)) obtains the share $\langle a \rangle_{(PA(k)\in SP(i+1))}$ by the following equation.

$$\langle a \rangle_{(PA(k)\in SP(i+1))} = \langle a \rangle_{(PA(0)\in SP(i))} - \sum_{1 \le j < k} r(i, j)$$

The secure computation apparatus PA(φ(i, 0)) transmits to the secure computation apparatus PA(φ(i+1, k)) obtained as described above.

Further, each of the redistribution unit 14-φ(i, j) of the secure computation apparatus PA(φ(i, j)) obtains the share $\langle a \rangle_{(PA(j)\in SP(i+1))}$ using share $\langle a \rangle_{(PA(j)\in SP(i))}$ for j=1, . . . , k−1, and random number r(i, j). That is, each of the redistribution unit 14-φ(i, j) of the secure computation apparatus PA(φ(i, j)) obtains a share $\langle a \rangle_{(PA(j)\in SP(i+1))}$ by the following equation (step S15).

$$\langle a \rangle_{(PA(j)\in SP(i+1))} = \langle a \rangle_{(PA(j)\in SP(i))} r(i,j)$$

The control unit 16-$w$ of all the secure computation apparatuses PA(w) sets i+1 to a new i (step S16), and the process proceeds to step S13.

In step S17, which is executed when i≥N−1 in step S14, post-conversion units 15-φ(N−1, 0), . . . , 15-φ(N−1, k−1) of the secure computation apparatus PA$_{(\phi(N-1, 0))}$, . . . , PA(φ(N−1, k−1)) belonging to the set SP(N−1) convert share $\langle a \rangle_{(SP(N-1))}$ stored in storage unit 17-φ(N−1, 0), . . . , φ(N−1, k−1) into desired data in step S13. For example, the post-conversion unit 15-φ(N−1, 0), . . . , 15-φ(N−1, k−1) may convert and output share $\langle a \rangle_{(SP(N-1))}$ to share $[a]_{(SP(N-1))}$ according to (k, n)-secret sharing scheme (see, for example, reference 3 and the like), or convert (reconstruct) a restored value ($2^\rho a \in Z_p$), and output.

Reference 3: Kikuchi, R., Ikarashi, D., Matsuuda T., Hamada, K. and Chida, K.: Efficient Bit-Decomposition and Model -Conversion Protocol with an Honest Maiory, Information Security and Privacy—23rd Australasian Conference, ACISP 2018, Wall, and Along, SWA, and Wall Jul. 11-13, 2018, Proceedings (Susilo, W. and Yang, G., eds.), Lecture Notes in computer Sciences, Vol. 10946, Spring, PP. 64-82 (online), DOI 10.1007/978-3-319-93638-35 (2018).

Second Embodiment

In the second embodiment, a specific example of the first embodiment will be described.

In the present embodiment, a specific example in the case of k=2 and n=3 will be described.

In this case, N=3 and i=0, 1, 2. Further, in the present embodiment, SP(0)=(PA(0), PA(1)), SP(1)=(PA(1), PA(2)), SP(2)=(PA(0), PA(2)). Share $\langle a \rangle_{(SP(0))}$ is $a_0$ and $a_1$, $a=a_0+a_1 \in Z_P$, $\rho = \rho_{01} + \rho_{12} + \rho_{20} \in Z_p$, ρ(SP(0))=ρ(SP(1))=ρ(SP(1))=

$\rho_{01}$, $\rho_{12}$, $\rho_{20}$. Further, PA($\varphi$(0, 0))=PA(0), PA($\varphi$(1, 2))=PA(2), PA($^{SM}$(0, 1))=PA(1), and PA($\varphi$(1,0))=PA(1), PA($\varphi$(2, 2))=PA(0), PA($\varphi$(1, 1))=PA(2), and r(0, 1)=$r_{01}$, r(1, 1)=$r_{12}$.

In this case, the number of communication stages can be reduced by parallelizing the unit rotation and redistribution as follows.

In step S11, the pre-conversion units 12-0 and 12-1 of the two secure computation apparatuses PA(0) and PA(1) belonging to the set SP(0) convert shares $[a]_0, \ldots, [a]_1$ held in set SP(0) or a public value to shares $<a>_0=a_0$, $<a>_1=a_1$ (share $<a>_{(SP(0))}$) obtained by secret sharing of a according to (2,2)-additive secret sharing scheme. The storage unit 17-0 of the secure computation apparatus PA(0) stores $a_0$, and the storage unit 17-1 of the secure computation apparatus PA(1) stores $a_1$.

The unit rotation unit 13-0 and the redistribution unit 14-0 of the secure computation apparatus PA(0) obtain $$B_0 = 2^{\rho_{01}} a_0 - r_{01}$$

using $\rho_{01}$, $a_0$, $r_{01}$ and transmit them to the secure computation apparatus PA(2) (corresponding to step S13 of i=0 and in step S15).

Further, the unit rotation unit 13-1 and the redistribution unit 14-1 of the secure computation apparatus PA(1) obtain $$B_1 = 2^{\rho_{12}}(2^{\rho_{01}} a_1 + r_{01}) - r_{12}$$

using $\rho_{01}$, $\rho_{12}$, $a_1$, $r_{01}$, $r_{12}$, and transmit them to the secure computation apparatus PA(0) (corresponding to step S13 and step S15 of i=0, and step S13 and step S15 of i=1). Further, the unit rotation unit 13-1 of the secure computation apparatus PA(0) obtains $$<c>_0 2^{\rho_{20}} B_1$$

using $\rho 20$ and B1 (corresponding to step S13 of i=2).

The unit rotation unit 13-2 and the redistribution unit 14-2 of the secure computation unit PA(2) obtain $$<c>_2 = 2^{\rho_{20}}(2^{\rho_{12}} B_0 + r_{12})$$

using $\rho_{20}$, $\rho_{12}$, $B_0$, $r_{12}$ (corresponding to step S13 and step S15 of i=1, and step 13 of i=2).

As shown below, $<c>_0$ and $<c>_2$ have a share of $2^\rho a \in A_P$ according to the (2,2)-additive secret sharing scheme.

$$\begin{aligned}
\langle c \rangle_0 &= 2^{\rho_{20}} B_1 = 2^{\rho_{20}}(2^{\rho_{12}}(2^{\rho_{01}} a_1 + r_{01}) - r_{12}) \\
&= 2^{\rho_{20}+\rho_{12}+\rho_{01}} a_1 + 2^{\rho_{20}+\rho_{12}} r_{01} - 2^{\rho_{20}} r_{12} \\
&= 2^\rho a_1 + 2^{\rho_{20}+\rho_{12}} r_{01} - 2^{\rho_{20}} r_{12} \\
\langle c \rangle_2 &= 2^{\rho_{20}}(2^{\rho_{12}} B_0 + r_{12}) \\
&= 2^{\rho_{20}}(2^{\rho_{12}}(2^{\rho_{01}} a_0 - r_{01}) + r_{12}) \\
&= 2^{\rho_{12}+\rho_{01}+\rho_{20}} a_0 - 2^{\rho_{12}+\rho_{20}} r_{01} + 2^{\rho_{20}} r_{12} \\
&= 2^\rho a_0 - 2^{\rho_{12}+\rho_{20}} r_{01} + 2^{\rho_{20}} r_{12}
\end{aligned}$$

Therefore, $<c>_0 + <c>_2 = 2^\rho (a_0 + a_1) = 2^\rho a \in Z_P$ holds.

Modification 1 of Second Embodiment

Modification 1 of the second embodiment is a specific example in the case of k=3, n=5. In this case, N=10, i=0, 1, . . . , 9.

Further, in this modification, SP(0)=(PA(0), PA(1), PA(2)), SP(1)=(PA(1), PA(2), PA(3)), SP(2)=(PA(2), PA(3), PA(4)), SP(3)=(PA(0), PA(3), PA(4)), SP(4)=(PA(0), PA(1), PA(4)), SP(5)=(PA(1), PA(3), PA(4)), SP(6)=(PA(0), PA(1), PA(3)), SP(7)=(PA(0), PA(2), PA(3)), SP(8)=(PA(0), PA(2), PA(4)), SP(9)=(PA(1), PA(2), PA(4)). Thereby, as in the second embodiment, unit rotation and redistribution can be parallelized, and the number of communication stages can be reduced.

[Hardware Configuration]

The secure computation apparatus PA(j) in the embodiment is a device configured by executing a predetermined program by a general-purpose or dedicated computer including a processor (a hardware processor) such as a CPU (central processing unit), memory such as a RAM (random-access memory), a ROM (read-only memory), and the like. The computer may include one processor or memory, or may include a plurality of processors or memories. This program may be installed in a computer or may be recorded in a ROM or the like in advance. In addition, a part or all of the processing unit may be constituted by using an electronic circuit which realizes a processing function independently, instead of an electronic circuit which realizes a functional configuration by reading a program like a CPU. Further, an electronic circuit constituting one apparatus may include a plurality of CPUs.

Figure 4:
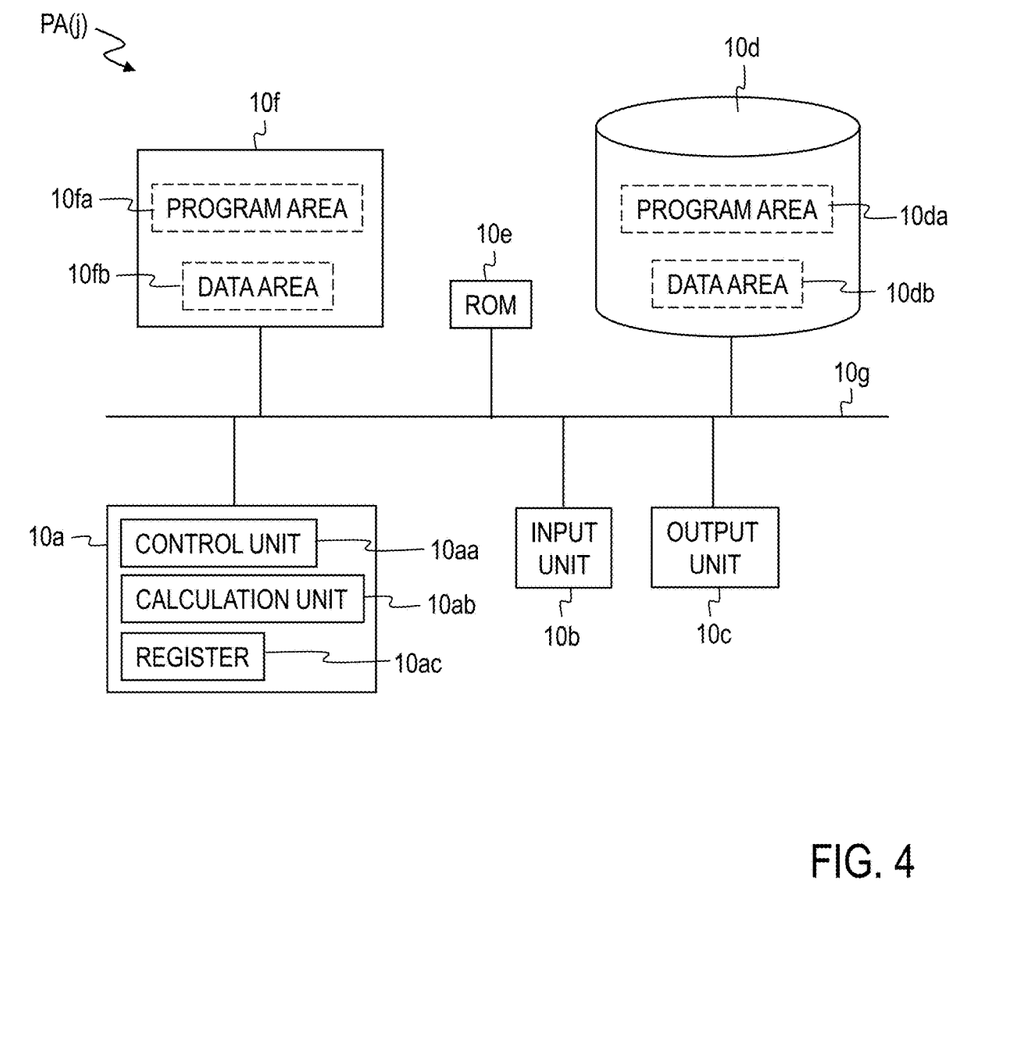
FIG. 4 is a block diagram for exemplifying the hardware configuration of the secure computation apparatus of the embodiment.

FIG. 4 is a block diagram illustrating a hardware configuration of the secure computation apparatus PA(j) according to the embodiment. As illustrated in FIG. 4, the secure computation apparatus PA(j) of this example includes a CPU (Central Processing Unit) 10a, an input unit 10b, an output unit 10c, a RAM (Random Access Memory) 10d, a ROM (Read Only Memory) 10e, an auxiliary storage device 10f, and a bus 10g. The CPU 10a of this example has a control unit 10aa, a calculation unit 10ab and a register 10ac and executes various calculation processing according to various programs read in the register 10ac. The input unit 10b is provided with a communication device to which data are input, an input terminal, a keyboard, a mouse, a touch panel or the like. The output unit 10c is a communication device, an output terminal, a display or the like for outputting data. The RAM 10d is an SRAM (Static Random Access Memory), a DRAM (Dynamic Random Access Memory) or the like, and has a program area 10da for storing a prescribed program and a data area 10db for storing various data. Further, the auxiliary storage device 10f includes, for example, a hard disk, a MO (Magneto-Optical disk), a semiconductor memory or the like has a program area 10fa in which a predetermined program is stored and a data area 10fb in which various data are stored. The bus 10g also includes a CPU 10a, an input unit 10b, an output unit 10c, the RAM 10d, the ROM 10e and the auxiliary storage device 10f are connected so as to exchange information. The CPU 10 a writes a program stored in a program area 10fa of an auxiliary storage device 10f in a program area 10da of a RAM 10d according to the read OS (Operating System) program. Similarly, the CPU 10a writes various data stored in a data area 10fb of the auxiliary storage device 10f in a data area 10db of the RAM 10d. Then, an address on the RAM 10d in which the program and data are written is stored in a register 10ac of the CPU 10a. A control unit 10aa of the CPU 10a sequentially reads the addresses stored in the register 10ac, reads the program and data from an area on the RAM 10d indicated by the read address, makes a calculation unit 10ab sequentially execute the calculation indicated by the program, and stores the calculation result in the register 10ac. With such a configuration, a functional configuration of the secure computation apparatus PA(j) is realized.

The above program can be recorded on a computer-readable recording medium. An example of computer-readable recording medium is non-transitory (non-transitory) recording medium. Examples of such recording media are magnetic recording devices, optical disks, magneto-optical recording media, semiconductor memory, and the like.

The distribution of the program is performed by, for example, selling, transferring and transferring a portable recording medium such as a DVD or CD-ROM recording the program, lending or the like. Further, the program may be stored in the storage device of the server computer and transferred from the server computer to another computer via the network to distribute the program. As described above, a computer executing such a program is configured to execute, for example, a program recorded on a portable recording medium or a program transferred from a server computer, and the data are once stored in its own storage device. When executing the processing, the computer reads the program stored in its own storage device, and executes the processing according to the read program. As another execution form of the program, the computer may directly read the program from the portable recording medium and execute processing according to the program, each time a program is transferred from the server computer to the computer, processing according to the received program may be executed sequentially. In addition, by a so-called ASP (Application Service Provider) type service which does not transfer a program from the server computer to the computer and realizes a processing function only by the execution instruction and the result acquisition, The above-mentioned processing may be executed. It is assumed that the program in this embodiment includes information that is used for processing by a computer and is equivalent to a program (e.g., data that is not a direct command to a computer but has the nature of defining the processing of a computer).

In each embodiment, the present apparatus is configured by executing a predetermined program on a computer. However, at least a part of these processing contents may be realized by hardware.

[Other Modifications]

The present invention is not limited to the above-described embodiment. For example, the redistribution of the above embodiments can be further generalized as follows. Input: Share sha (a, i) of a according to the (k, k)-secret sharing scheme, which is restorable by linear combination calculation. Here, k secure computation apparatuses $PA(\varphi(i, 0)), \ldots, PA(\varphi(i, k-1))$ have a share sha(a, i).

Output: share [a(i)] according to (k, n)-secret sharing scheme having additive homomorphism Processing:

1. The secure computation apparatus PA(p(i, i')) (where i'=0, . . . , k−1) having the share sha(a, i) performs secret sharing of the share [sha(a, i)_$\varphi$(i, i')] according to the (k, n)-secret sharing scheme of own share sha(a, i). As a result, the share [sha(a, i)_$\varphi$(i, i')] is shared by k secure computation apparatuses $PA(\varphi(i, 0)), \ldots, PA(\varphi(i, k-1))$. This is a share in which a is doubly performed secret sharing, that is, a share of share of a.

2. Each secure computation apparatus PA($\varphi$(i, i')) restores the sha(a, i) component inherent in each share by adding and multiplying the public value of the secure computation and performing linear combination for a share [sha(a, i)_$^{SM}$(i, 0)], . . . , [sha(a, i)_$\varphi$(i, k−1)]. As a result, each secure computation apparatus PA($\varphi$(i, i')) obtains a share [a(i)] according to the (k, n)-secret sharing scheme.

In this process, the share $<a>_{(PA(0)\in SP(i))}$ of the above-described embodiment is generalized to the share sha(a), and the share $<a>_{(PA(k)\in SP(i+1))}$ is generalized to the share of k secure computation apparatuses arbitrarily selected, among the shares [a(i)] according to the (k, n)-secret sharing scheme. In the embodiment, SP(0), . . . , SP(N−1) hold $|SP(i')\cap SP(i'+1)^c|=1$ for i'=0, . . . , N−2, however, it does not have to be configured in this way. Further, the (k, k)-secret sharing scheme is not limited, and may be an additive secret sharing scheme or another secret sharing scheme such as the Shamir secret sharing scheme. The various kinds of processing described above are not necessarily sequentially executed according to the description, and may also be executed in parallel or individually depending on the processing capabilities of the device that executes the processing or according to the need. In addition, as a matter of course, it is possible to variously modify the present invention as appropriate without departing from the spirit of the present invention.

REFERENCE SIGNS LIST

1 Secure computation system
PA(j) Secure computation apparatus
13-j Unit rotation unit
14-j Redistribution unit

The invention claimed is:

1. A secure computation system for efficient rotation by secure computation, the secure computation system comprising:

n secure computation apparatuses PA(0), . . . , PA(n−1), wherein n and k are integers of 2 or more; n>k; $N={}_nC_k$; PA is a set of the n secure computation apparatuses PA(0), . . . , PA(n−1); SP(i) is a set of k secure computation apparatuses $PA(\varphi(i, 0)), \ldots, PA(\varphi(i, k-1))$ selected from PA; i=0, . . . , N−1; SP(0), . . . , SP(N−1) hold $|SP(i')\cap SP(i+1)^c|=1$ for i'=0, . . . , N−2;

P is an integer of 1 or more; p is the number of bits of the integer P; a is an element of a residue class ring $Z_P$ modulo P; share $<a>_{(SP(i))}$ is k shares, according to additive secret sharing scheme, held by the set SP(i); share $<a>_{(SP(0))}$ is a share obtained by secret sharing of a according to additive secret sharing scheme; $<a>_{(PA(\theta)\in SP(i))}$ is a share held by the secure computation apparatus $PA(\theta) \in SP(i)$ of the share $<a>_{(SP(i))}$;

$\rho$ is an element of a residue class ring $Z_p$ modulo p; sub-shares of n shares $<<\rho>>0, \ldots, <<\rho>>n-1$ obtained by the secret sharing of p according to a replicated secret sharing scheme are $\rho_0, \ldots, \rho_{N-1} \in Z_p$, $\rho_{(SP(i))}$ is a sub-share corresponding to the set SP(i) among the sub-shares $\rho_0, \ldots, \rho_{N-1}$;

$PA(\varphi(i', 0))$ is a secure computation apparatus, which is included in the set SP(i') but not included in the set SP(i'+1); $PA(\varphi(i'+1, k))$ is a secure computation apparatus, which is not included in the set SP(i') but included in the set SP(i'+1); $PA(\varphi(i', j))$ for j=1, . . . , k−1 is a secure computation apparatus, which is included in both the set SP(i') and the set SP(i+1);

secure computation apparatuses $PA(\varphi(i, 0)), \ldots, PA(\varphi(i, k-1))$ include processing circuitry configured to execute efficient unit rotation calculating $2^{\rho(SP(i))}$ $<a>_{(SP(i))} \in Z_p$ to obtain a new share $<a>_{(SP(i))}$; and the secure computation apparatus $PA(\varphi(i', 0))$ includes processing circuitry configured to obtain a share $<a>_{(PA(k)\in SP(i'+1))}$ using a share $<a>_{(PA(0)\in SP(i'))}$ and random numbers r(i', 1), . . . , r(i', k−1)), the random numbers r(i', 1), . . . , r(i', k−1)) being shared by the secure computation apparatus $PA(\varphi(i', 0))$ and the secure computation apparatuses $PA(\varphi(i', 1)) \ldots, PA(\varphi(i',k-1))$, and then transmit the share $<a>_{(PA(k)\in SP(i'+1))}$ to the secure computation apparatus PA($\varphi$(i'+1, k) via a network, each of the secure computation apparatuses PA($\varphi$(i', j)) includes processing circuitry configured to perform redistribution to obtain a share $\langle a \rangle_{(PA(j) \in SP(i'+1))}$ using a share $\langle a \rangle_{(PA(j) \in SP(i'))}$ and the random number r(i', j) for j=1, ..., k−1.

2. The secure computation system according to claim 1, wherein in the redistribution, the secure computation apparatus PA($\varphi$(i', 0)) obtains the share $\langle a \rangle_{(PA(k) \in SP(i'+1))}$ according to the following equation $$\langle a \rangle_{(PA(k) \in SP(i'+1))} = \langle a \rangle_{(PA(0) \in SP(i'))} - \sum_{1 \leq j < k} r(i', j);$$

and the each secure computation apparatus PA($\varphi$(i', j)) obtains the share $\langle a \rangle_{(PA(j) \in SP(i'+1))}$ by the following equation $$\langle a \rangle_{PA(j) \in SP(i'+1))} = \langle a \rangle_{(PA(j) \in SP(i'))} + r(i', j).$$

3. The secure computation system according to claim 1, wherein

SP(0), ..., SP(N−1) are different from each other; and the set SP(i) executes the redistribution for i=0 to i=N−2, respectively followed by the unit rotation, and the set SP(i) executes the unit rotation for i=N−1.

4. The secure computation system according to claim 1, wherein k=2, n=3, N=3, i=0, 1, 2,

SP(0)=(PA(0), PA(1)), SP(1)=(PA(1), PA(2)), SP(2)=(PA(0), PA(2)), share$\langle a \rangle$(SP(0)) is $a_0$ and $a_1, a=a_0+a_1 \in Z_p$, $\rho = \rho_{01}+\rho_{12}+\rho_{20} \in Z_p, \rho(SP(0))=(SP(1))=(SP(1))=\rho_{01}, \beta_{12}, \rho_{20}$, PA($\varphi$(0, 0))=PA(0), PA($\varphi$(1, 2))=PA(2), PA((0, 1))=PA(1), PA($\varphi$(1, 0))=PA(1), PA($\varphi$(2, 2))=PA(0), PA($\varphi$(1, 1))=PA(2), r(0, 1)=$r_{01}$, r(1, 1)=$r_{12}$, a secure computation apparatus PA(0) obtains $B_0 = 2^{\rho 01} a_0 - r_{01}$ by using $\rho_{01}$, $a_0$, $r_{01}$ and transmits $B_0$ to the secure computation apparatus PA(2), a secure computation apparatus PA(1) obtains $B_1 = 2^{\rho 12}(2^{\rho 01} a_1 + r_{01}) - r_{12}$ by using $\rho_{01}, \rho_{12}, a_1, r_{01}, r_{12}$ and transmits Bi to the secure computation apparatus PA(0), the secure computation apparatus PA(0) obtains $2^{\rho 20} B_1$ by using $\rho_{20}$ and $B_1$, the secure computation apparatus PA(2) obtains $2^{\rho 20}(2^{\rho 12} B_0 + r_{12})$ by using $\rho_{20}, \rho_{12}, B_0$, and $r_{12}$.

5. The secure computation system according to claim 1, wherein k=3, n=5, N=10, i=0, 1, ..., 9, SP(0)=(PA(0), PA(1), PA(2)), SP(1)=(PA(1), PA(2), PA(3)), SP(2)=(PA(2), PA(3), PA(4)), SP(3)=(PA(0), PA(3), PA(4)), SP(4)=(PA(0), PA(1), PA(4)), SP(5)=(PA(1), PA(3), PA(4)), SP(6)=(PA(0), PA(1), PA(3)), SP(7)=(PA(0), PA(2), PA(3)), SP(8)=(PA(0), PA(2), PA(4)), SP(9)=(PA(1), PA(2), PA(4)).

6. A secure computation system for efficient rotation by secure computation, the secure computation system comprising:

n secure computation apparatuses PA(0), ..., PA(n−1), wherein

N and k are integers of 2 or more; n >k; N=$_nC_k$; PA is a set of the n secure computation apparatuses PA(0), ..., PA(n−1); SP(i) is a set of k secure computation apparatuses PA($\varphi$(i, 0)), ..., PA($\varphi$(i, k−1)) selected from PA; i=0, ..., N−1, i'=0, ..., N−2;

P is an integer of 1 or more; p is the number of bits of the integer P; a is an element of a residue class ring $Z_P$ modulo P; share $\langle a \rangle_{(SP(i))}$ is k shares, according to additive secret sharing scheme, held by the set SP(i);
share $\langle a \rangle_{(SP(0))}$ is a share obtained by secret sharing of a according to additive secret sharing scheme; $\langle a \rangle_{(PA(\theta) \in SP(i))}$ is a share held by the secure computation apparatus PA($\theta$)$\in$ SP(i) of the share $\langle a \rangle_{(SP(i))}$;

$\rho$ is an element of a residue class ring $Z_p$ modulo p; sub-shares of n shares $\langle\langle \rho \rangle\rangle_0, ..., \langle\langle \rho \rangle\rangle_{n-1}$ obtained by the secret sharing of p according to a replicated secret sharing scheme are $\rho_0, ..., \beta_{N-1} \in Z_p$; $\rho$(SP(i)) is a sub-share corresponding to the set SP(i) among the sub-shares $\rho_0, ..., \beta_{N-1}$, secure computation apparatuses PA($\varphi$(i, 0)), ..., PA($\varphi$(i, k−1)) include processing circuitry configured to execute efficient unit rotation calculating $2^{\rho(SP(i))} \langle a \rangle$(SP(i)) $\in Z_p$ to obtain a new share $\langle a \rangle_{(SP(i))}$;

the secure computation apparatus PA($\varphi$(i', 0)) includes processing circuitry configured to obtain a share $\langle a \rangle_{(PA(k) \in SP(+1))}$ using a share $\langle a \rangle_{(PA(0) \in SP(i'))}$, and then transmit the share $\langle a \rangle_{(PA(K) \in SP(i+1))}$ to the secure computation apparatus PA($\varphi$(i'+1, k)) via a network, each of the secure computation apparatuses PA($\varphi$(i', j)) includes processing circuitry configured to perform redistribution to obtain a share $\langle a \rangle_{(PA(j) \in SP(i+1))}$ using a share $\langle a \rangle_{(PA)j) \in SP(i'))}$ for j=1, ..., k−1.

7. A secure computation apparatus of the secure computation system according to claim 1.

8. A secure computation method for efficient rotation by secure computation by n secure computation apparatuses PA(0), ..., PA(n−1), wherein n and k are integers of 2 or more; n >k; N=$_nC_k$; PA is a set of the n secure computation apparatuses PA(0), ..., PA(n−1); SP(i) is a set of k secure computation apparatuses PA($\varphi$(i, 0)), ..., PA($\varphi$(i, k−1) selected from PA; i=0, ..., N−1; SP(0), ..., SP(N−1) hold |SP(i') ∩ SP(i'+1)$^c$|=1 for i'=0, ..., N−2;

P is an integer of 1 or more; p is the number of bits of the integer P; a is an element of a residue class ring $Z_p$ modulo P; share $\langle a \rangle_{(SP(i))}$ is k shares, according to additive secret sharing scheme, held by the set SP(i); share $\langle a \rangle_{(SP(i))}$ is a share obtained by secret sharing of a according to additive secret sharing scheme; $\langle a \rangle_{(PA(\theta) \in SP(i))}$ is a share held by the secure computation apparatus PA($\theta$) $\in$ SP(i) of the share $\langle a \rangle_{(SP(i))}$;

$\rho$ is an element of a residue class ring $Z_p$ modulo p; sub-shares of n shares $\langle\langle \rho \rangle\rangle_0, ... \langle\langle \rho \rangle\rangle_{n-1}$ obtained by the secret sharing of p according to a replicated secret sharing scheme are $\rho_0, ..., \beta_{N-1} \in Z_p$; $\rho_{(SP(i))}$ is a sub-share corresponding to the set SP(i) among the sub-shares $\rho_0, ..., \beta_{N-1}$;

PA($\varphi$(i', 0)) is a secure computation apparatus, which is included in the set SP(i') but not included in the set SP(i'+1); PA($\varphi$(i'+1, k)) is a secure computation apparatus, which is not included in the set SP(i') but included in the set SP(i'+1); PA($\varphi$(i', j)) for j=1, ..., k−1 is a secure computation apparatus, which is included in both the set SP(i') and the set SP(i'+1);
the secure computation method comprises:
efficient rotating by calculating $2^{\rho(SP(i))}<a>_{(SP(i))} \in Z_p$ to obtain a new share $<a>_{(SP(i))}$ by secure computation apparatuses PA(φ(i, 0)), . . . , PA(φ(i, k−1)); and
obtaining a share $<a>_{(PA(K) \in SP(1+1)}$ using a share $<a>_{(PA(0) \in SP\ (i'))}$ and random numbers r(i', 1), . . . , r(i', k−1)) by the secure computation apparatus PA(φ(i', 0)), the random numbers r(i', 1), . . . , r(i', k−1) being shared by the secure computation apparatus PA(φ(i', 0)) and the secure computation apparatuses PA(φ(i', 1)) . . . , PA(φ(i',k−1)), then transmitting the share $<a>_{(PA(k) \in SP(1'+1))}$ to the secure computation apparatus PA(φ(i'+1, k)) via a network, and obtaining a share $<a>_{(PA(j) \in SP(i'+1))}$ using a share $<a>_{(PA(j) \in SP(i'))}$ and the random number r(i', j) by each of the secure computation apparatuses PA(φ(i', j)) for j=1, . . . , k−1.

9. A secure computation method by a secure computation system for efficient rotation by secure computation, the secure computation system including n secure computation apparatuses PA(0), . . . , PA(n−1), wherein
n and k are integers of 2 or more; n >k; N=$_nC_k$; PA is a set of the n secure computation apparatuses PA(0), . . . , PA(n−1);SP(i) is a set of k secure computation apparatuses PA(φ(i, 0)), . . . , PA(φ(i, k−1)) selected from PA; i=0, . . . , N−1; i'=0, . . . , N−2;
P is an integer of 1 or more; p is the number of bits of the integer P; a is an element of a residue class ring $Z_p$ modulo P; share $<a>_{(SP(i))}$ is k shares, according to additive secret sharing scheme, held by the set SP(i); share $<a>_{(SP(0))}$ is a share obtained by secret sharing of a according to additive secret sharing scheme;
$<a>_{(PA(\theta) \in SP(i))}$ is a share held by the secure computation apparatus PA(θ)∈SP(i) of the share $<a>_{(SP(i))}$;
ρ is an element of a residue class ring $Z_p$ modulo p,
sub-shares of n shares <<ρ>>0, . . . , <<ρ>>$_{n−1}$ obtained by the secret sharing of ρ according to a replicated secret sharing scheme are $\rho_0, \ldots, \beta_{N-1} \in Z_p$;
$\rho_{(SP(i))}$ is a sub-share corresponding to the set SP(i) among the sub-shares $\rho_0, \ldots, \beta_{N-1}$;
the secure computation method comprises:
efficient rotating by calculating $2\rho^{(SP(i))}<a>_{(SP(i))} \in Z_p$ to obtain a new share $<a>_{(SP(i))}$ by secure computation apparatuses PA(φ(i, 0)), . . . , PA(φ(i, k−1)); and
obtaining a share $<a>_{(PA(k) \in SP(i'+1))}$ using a share $<a>_{(PA(0) \in SP(i))}$ by the secure computation apparatus PA(i', 0)), and then transmitting the share $<a>_{(PA(k) ESP(1'+1))}$ to the secure computation apparatus PA(φ(i'+1, k)) via a network, performing redistribution to obtain a share $<a>_{(PA(j) \in SP(i'+1))}$ using a share $<a>_{(PA(j) \in SP(i'))}$ by each of the secure computation apparatuses PA(φ(i', j)) for j=1, . . . , k−1.

10. A non-transitory computer-readable recording medium storing a program for causing a computer to function as the secure computation apparatus according to claim 7.

11. A secure computation apparatus of the secure computation system according to claim 6.

12. A non-transitory computer-readable recording medium storing a program for causing a computer to function as the secure computation apparatus according to claim 11.

* * * * *